Patented Dec. 30, 1941

2,267,842

UNITED STATES PATENT OFFICE 2,267,842

MANUFACTURE OF ARTIFICIAL MATERIALS SUCH AS FIBERS

Paul Schlack, Berlin-Treptow, Germany, assignor, by mesne assignments, to Walther H. Duisberg, New York, N. Y.

No Drawing. Application October 31, 1935, Serial No. 47,638. In Germany November 1, 1934

3 Claims. (Cl. 18—54)

My present invention relates to the manufacture of artificial fibers and films having an increased affinity for acid dyes. More particularly, it relates to the production of such fibers and films from cellulose esters and ethers and the like organophil polymers.

Artificial products, such as artificial threads or films of organic cellulose derivatives and other highly polymerized organic substances, for instance, polyvinyl esters, partially saponified polyvinyl esters, polyvinyl acetate, polyacrylic acid derivatives and mixtures of these materials have no affinity or only a very limited affinity for many dyestuffs, for example, acetate artificial silk is only feebly to moderately dyed when treated in normal manner with acid dyestuffs such as Orange II (Schultz Farbstofftabellen, 7th edition, vol. 189), Metanil Yellow (Schultz Farbstofftabellen, 7th edition, vol. I, No. 169), Alizarine Direct Bue A (Schultz Farbstofftabellen, 7th edition, vol. 2, page 9), Alizarine Direct Violet ER (Schultz Farbstofftabellen, 7th edition, vol. II, p. 10), Alizarine Yellow RW (Schultz Farbstofftabellen, 7th edition, vol. I, No. 66), and even then the dye-bath is only very poorly exhausted.

It is known that the affinity of cellulose esters or ethers to such dyestuffs can be considerably improved by introducing basic radicals into the cellulose molecule. The various methods hitherto proposed for this purpose are, however, tiresome, costly and in most cases affect the quality of the product considerably.

It has already been proposed to incorporate proteins with organic colloids, particularly cellulose acetate. Such heterogeneous mixtures can be made into artificial products only with difficulty and yield products with unsatisfactory or at best moderate physical properties, at all events when the protein content is sufficiently great to ensure satisfactory dyeing.

It is therefore an object of the present invention to provide a process for increasing considerably the affinity of such materials for dyestuffs or dyestuff derivatives or dyestuff components having acid groups, without substantially damaging the physical properties of said materials. For this purpose there is added to the solution from which the material is to be formed one or more synthetic bodies of high molecular weight which are soluble in organic solvents and insoluble or sparingly soluble in water and which contain basic radicals in free condition or bound in salt-like manner, or can be converted by hydrolysis, reduction or treatment with an alkylating agent, either in themselves or in the formed material, into products having a basic character.

For the purpose of the invention a large number of artificial resins comes into consideration which hitherto have found no, or but little application, or have not been known. A series of such substances are listed below but the list is by no means exhaustive:

1. Condensation products from aromatic amines and formaldehyde, for instance, the polymeric methylene-amino-benzylaniline obtainable as described in German specification No. 121,506 from ortho-toluidine and formaldehyde.

2. Basic ethers of condensation products from carbonyl compounds, for instance the reaction products of "Novolacs" with β-chlorethyl-diethylamine. Of these products especially those are advantageous which, in addition to the etherified phenol hydroxyl groups, contain radicals which improve solubility, for example, carboxyl groups esterified with aliphatic mono- or poly-hydric alcohols, acyl amido-groups, sulfamido-groups or alkoxy-groups.

The products are obtainable by boiling a solution of a "Novolac" in an alcoholic solution of potassium hydroxide or in a solution of sodium alcoholate with β-chlorethyldiethylamine until the phenol-hydroxyl groups are completely substituted. The products are insoluble in alkaline solutions. The influence of the oxygen contained in the air must be excluded in the reaction in order to obtain light products. A very valuable product is for instance obtained by boiling the condensation product obtained from salicylic acid dimethyl-amide and formaldehyde in the presence of hydrochloric acid, with β-chloroethyldiethylamine in the presence of sodium alcoholate and absolute alcohol.

3. Products of reaction of chlorinated methylene-alkyl-aryl resins obtainable from xylene and formaldehyde with amines or substitution products thereof, for instance, dimethylamine, piperidine, morpholine, ethanolamine, glycine ester. The solubility of the resin may be influenced as may be desired by advantageous choice of the substituents. Products of this kind are mentioned in German Patent No. 542,778.

4. Products of reaction of amines with halogen acyl compounds of artificial polymeric poly-hydroxyl compounds such as polyvinyl chloracetate, mixed polymerization products containing vinylchloracetate as a starting component, polyglycidchloracetate, mixed polymerisates from vinyl chloracetate and vinyl alkyl-ethers, acrylic acid alkyl esters and the like, poly-glycide chloracetate, chloracetates of hydroxyalkylated "Novolac" and the like. Products of reaction of polyvinyl chloracetate with amines are described in German specification No. 542,778. It is of advantage to carry out the reaction in a solvent free from hydroxyl groups. Polyglycid is described in German Patent No. 575,750. The chloracetate is obtainable by treating polyglycid with chloracetic anhydride, whereby chloracetic acid is preferably used as a solvent.

5. Products of reaction of ammonia or amines with ethers of compounds of high molecular weight having active halogen, particularly compounds having 1,2-halogeno-hydroxy-groups, for instance, the products of reaction of epichlorhydrin on ethoxylated "Novolacs," partially saponified polyvinyl esters or the like, as well as the glycides obtainable by treatment of these chlorhydrins with alkali. For the production of the chlorohydroxypropylethers epichlorhydrin is caused to react on "Novolacs" or partially saponified polyvinylacetates under pressure and in the presence of boric acid, dimethylsulfate, toluenesulfonic acid or a similar acid catalyst. A reaction temperature between 130° and 170° C. is maintained.

6. Polymerization products of unsaturated compounds which contain basic nitrogen or are capable of conversion by saponification or reduction into products having basic nitrogen such as polymerization products of vinyl ethers or divinyl ethers of amino-hydroxy compounds, for instance, the polymerization product from 8-hydroxy-quinoline-vinyl-ether and products of reduction thereof, polymerizates of para-acet-amino-styrene or para-nitro-styrene. Polymerization products of this kind may be obtained, for instance, according to Brit. Patent 407,997.

7. Basic amides of polymeric carboxylic acids, for instance, the product of condensation of polyacrylic acid amide or partial amidated polyacrylic acid methyl ester and di-methylamino-methanol or analogues thereof.

For this condensation a polyamide is reacted with di-methylaminomethanol obtainable in known manner from 1 molecular proportion of formaldehyde and 1 molecular proportion of diethylamine in an autoclave in a suitable solvent containing preferably hydroxyl groups, for instance, methylglycol. Preferably there is added a weakly basic catalyst, for instance, a tertiary amine such as triethylamine or a salt of alkaline reaction such as potassium carbonate.

8. The products of reaction of amines on resins from halogenmethylaryl-sulfamides and formaldehyde, their derivatives and analogues. The halogenmethyl-aryl-sulfamides, for instance, p-chloromethyl-benzene-sulfamide is condensed with formaldehyde or an agent splitting off formaldehyde at a temperature of 100 to 130° C. and then the formed resin is reacted with an amine particularly with a tertiary amine at a lower temperature. The resins thus produced have only a restricted solubility in organic solvents free from hydroxyl groups. It is, therefore, advantageous to work up the products in the presence of a large amount of alcohol, and to replace the halogen representing the anion by an organic anion, for instance by the radical of acetic acid.

9. Soluble products of the reaction of ammonia or amines with sulfo-esters of polyhydroxyl compounds, for example, toluene-sulfopolyglycide. Toluenesulfopolyglycid is obtainable by reaction with toluenesulfochloride on the sodium salt of polyglycid in a manner analogous to that according to which toluenesulfo-cellulose is made from alkali cellulose. The interaction with ammonia or an amine is carried out under pressure at a temperature of 60 to 100° C. An excess of amine is preferably used.

Particularly valuable are the basic derivatives of the polymerisates or mixed polymerisates of unsaturated compounds and basic derivatives of polyglycides. In the case of these bodies suitable choice of the degree of polymerisation leads particularly easily to the desired degree of solubility; moreover, the stability to light is in general quite good, an increase of stability to light is possible in the case of the basic resins having tertiary nitrogen, if the tertiary amino-group is converted into an amino-oxide group by treatment with hydrogen peroxide. The weakly basic amine-oxide groups can be again converted into more strongly basic groups by treatment with an alkylating agent. When the properties are otherwise equally good, products rich in basic groups are to be preferred, in particular products having strongly basic nitrogen united with aliphatic or hydrocyclic nuclei. The basic nitrogen may be wholly or in part in the form of quaternary ammonium groups, so far as the solubility in the inorganic solvents is ensured by the nature of the anions or by other groups in the molecule.

The described basic compounds are generally sparingly soluble or insoluble in water when present in form of the free base. In form of their salts, for instance, in form of the acetate or the formate they may be more or less soluble. However, also in this case, they cannot be removed from the artificial materials by washing or only slowly. A loss by washing can also be prevented as far as it is necessary by selecting a suitable anion. Compounds having the same anion may be added to the treating baths.

For economical reasons those products are the more important which contain nitrogenous radicals which are basic or convertible into basic condition. In principle, however, such polymerization or condensation products are also useful which contain sulfide- or phosphene-groups which, by addition of alkyl esters of inorganic acids, assume a basic character, for example, the products of reaction of sodium methyl mercaptide on the chlorinated resin from xylene and formaldehyde.

The dyeing effects obtainable by the addition of condensation products of this kind can be still further improved by subjecting to a partial saponification the finished artificial material before, or simultaneously with a treatment for the purpose of strengthening the basic properties. If desired the saponification can be conducted during the casting or spinning operation or directly following the same by means of any known saponifying agent, for instance, an alkali in water or a solvent containing hydroxyl, an aqueous solution of a salt of alkaline reaction such as sodium carbonate, sodium silicate, sodium phenolate, sodium sulfide, trisodium phosphate, ammonia or an amine. The saponifying solution may contain an accelerator of saponification, for instance, an alkali salt or a quaternary ammonium salt, in particular one having a capillary active radical, for instance, a carbon chain with more than 8 carbon atoms in its cation, also a buffer substance, a protective colloid, a wetting agent or a swelling agent. It is not always necessary to produce a deep saponification. A feeble saponification amounting to about 3-6 per cent which, for example, when using ammonia or an amine may proceed uniformly throughout the interior of the fibers, considerably increases the affinity. In this case the affinity for insoluble dyestuffs, for basic dyestuffs and for diazotisable amines is more or less completely retained. In the case of a feeble saponification the affinity for these dyestuffs and dyestuff components may indeed be increased. Many acid dyestuffs, which, like cyanine B, dye acetate silk only feebly even in the presence of the basic resinous additions, yield brilliant dyeings of normal strength and good properties of fastness after saponification. Many of the dyeings obtainable in this manner can be discharged pure white. With the saponification there may be united a dyeing with a direct dyeing dyestuff such as sulfurized dyestuffs or vat-dyestuffs whereupon top-dyeing with acid dyestuffs may follow. In this manner mixed textiles may be produced with valuable multi-color effects.

The material to be saponified may be in any condition, for example, in the form of loose fibers, slivers, cops, skeins, fabrics, knitted goods, ribbons or sheets.

The saponification and the conversion of the added substance into basic products, or both operations, can be locally effected either by printing, spraying or stencilling with a thickening agent carrying the necessary agent for the treatment or by impregnating the goods locally with a reserve, for example, a wax reserve or with a paste which contains an agent preventing alkali attack on the fiber, for example, an alkali salt of a phenol sulfonic acid.

When a reducible nitro-group or nitroso-group is present in the added resinous substance the saponification may be produced with advantage by means of sodium sulfide. There may be added to the saponifying agent an additional reducing agent such as hydrosulfite or a stannite. If the reduction is performed independently of the saponification in an acid medium stannous chloride or a titanous salt or other known acid reducing agent may be used.

The following examples illustrate the invention:

*Example 1.*—Acetyl cellulose having a content of 53 per cent of acetic acid and the artificial resin obtainable from ortho-toluidine and formaldehyde, as described in German Patent No. 121,506, are dissolved together in glacial acetic acid or ethylene chlorhydrin and the solution is cast to produce a film. The latter is dyed by Orange II substantially more intensely than a similarly made film of pure acetyl cellulose.

*Example 2.*—A solution of 400 parts of acetone, 92.5 parts of acetyl cellulose having 54.5 per cent of acetic acid and 7.5 parts of a basic artificial resin made by treating an acid condensation product from phenol (10 mol.) and formaldehyde (7 mol.) with diethylamine and formaldehyde is spun by the dry-spinning process; the artificial silk thus obtained is dyed substantially more deeply by Alizarine Direct Blue A than a similar material made from pure acetyl cellulose. The dyeings on pure acetate artificial silk are also less fast to water. A similar result is produced when using an artificial silk which consists of 72.5 parts of acetyl cellulose, 20 parts of polyvinyl formal and 7.5 parts of a basic phenol formaldehyde resin.

*Example 3.*—A solution of polyvinyl chloracetate in acetone is allowed to stand in admixture with 2 mol. piperidine at 40° C. until no more piperidine hydrochloride separates. The solution is filtered from the crystallized salt and mixed with a solution of acetyl cellulose having an acetic acid content of 53.5 per cent in acetone in the proportion such that 7.5 per cent of basic resin is precipitated on the acetyl cellulose. The artificial silk obtained by the dry-spinning operation is dyed by means of acid dyestuffs, for instance, intensely with Orange II and Alizarine Direct Violet ER. The brownish colour of the silk can be removed by a weak bleach.

*Example 4.*—To a solution of acetyl cellulose having an acetic acid content of 53.5 per cent of acetic acid in acetone there is added a solution of the basic resin from poly-glycide-chloracetate and morpholine in a proportion of 10 per cent of the acetyl cellulose. The silk obtained by dry-spinning has a high affinity for acid dyestuffs.

*Example 5.*—To a solution of ethyl cellulose having 45 per cent of ethoxyl there are added 10 per cent (calculated on the ethyl cellulose) of the basic resin obtainable by the action of morpholine on the chlorinated condensation product from xylene and formaldehyde. The films obtained from this solution can be dyed with acid dyestuffs.

*Example 6.*—A solution is prepared from 90 parts by weight of acetyl cellulose having an acetic acid content of 53 per cent, 10 parts of the artificial resin obtainable as described in German Patent No. 121,506 from ortho-toluidine and formaldehyde and 560 parts of glacial acetic acid; the solution is cast into the form of a film. The film is partially saponified by 12 hours immersion in an ammonia solution of 10 per cent strength, it is intensely dyed by acid dyestuffs such as Orange II.

*Example 7.*—An artificial silk made by the dry-spinning process from an acetone solution and consisting of 92.5 parts by weight of acetyl cellulose having an acetic acid content of 54.5 per cent and 7.5 parts of an artificial resin made from phenol formaldehyde and dimethylamine, is saponified in the form of a fabric with a caustic soda lye of about 0.2 per cent strength containing 10 grams of sodium acetate per liter, the temperature being 50° C. and the operation being continued until there is a diminution of dry weight amounting to 8 per cent. This fabric can be dyed with acid dyestuffs, for instance, cyanine B. The fastness of the dyeings can be improved by an after-treatment with an aqueous solution, feebly acid with acetic acid, of the artificial resin contained in the silk.

*Example 8.*—To a solution of ethyl cellulose in a mixture of benzene and alcohol there is added a proportion of 10 per cent of the cellulose ether of the resin obtainable by reaction of the chlorinated condensation product from xylene and formaldehyde with sodium mercaptide and the artificial product obtained from the solution is subsequently treated with methyl iodide at 70° C. The products have an increased affinity for acid dyes such as Orange II, Metanil Yellow, Fast Red AV and the like.

*Example 9.*—A solution of cellulose acetate containing 53 per cent of bound acetic acid, in a mixture of acetone and alcohol (70:30) to which have been added 7.5 per cent (calculated on the cellulose acetate) of the condensation product treated with nitrous acid and obtained by condensation of $\beta$-chlorethylmethylamine with the "Novolac" resin obtained by condensation of 10 molecular proportions of phenol and 7 molecular proportions of formaldehyde in the presence of a mineral acid, is spun into an aqueous precipitating bath containing about 200 grams of dioxane, 50 grams of sodium salicylate and 20 grams of acid zinc-formaldehyde-sulfoxylate per liter. The threads are cut into staples and are treated with a 5 per cent solution of stannous chloride containing 10 per cent of salicylic acid (calculated on the fibers) at 40 to 60° C. in order to completely split off the nitroso groups. The finished product is intensely dyed by acid wool dyes, for instance, such from the aminoanthraquinonesulfonic acid.

*Example 10.*—A spinning solution which contains besides cellulose acetate 10 per cent of a resin obtained by heating p-[methylthiomethyl]-benzenesulfamide (made of p-chlormethylbenzene-sulfamide and sodium methylmercaptide) and formaldehyde in the presence of formic acid, is spun into a neutral precipitating bath in which the toluene sulfonic acid methylester has been emulsified. The product is subsequently to its its production heated at 40 to 70° C. in the presence of prepared chalk. After this treatment the product has an increased affinity for acid dyes, for instance, Orange II. It may be assumed that part of the thioether groups have been transformed into methyl sulfonium groups.

*Example 11.*—A product obtained by condensation of p-butyl-phenol with formaldehyde in the presence of hydrochloric acid is reacted with the calculated quantity of β-bromethylamine in alcoholic alkaline solution and the product of reaction is mixed with the calculated quantity of chloral. This artificial resin is added in a quantity of 6 per cent (calculated on the cellulose derivative) to a solution of a moderately ethylated cellulose acetate in a mixture of benzene and alcohol. By after-treating films made from this solution with dilute formic acid containing 5 per cent of salicylic acid calculated on the film mass, a strong affinity for acid dyes is produced.

What I claim is:

1. A process of producing artificial fibers and foils with an increased capacity of being dyed by acid dyestuffs which comprises dissolving cellulose acetate and an orthotoluidineformaldehyde resin in glacial acetic acid and making said solution into films or artificial fibers.

2. A process of producing artificial fibers and foils with an increased capacity of being dyed by acid dyestuffs which comprises allowing a solution of polymerized vinylchloracetate in piperidine to stand at 40° C. until no more piperidine-hydrochloride separates, filtering the solution from said crystallized piperidine-hydrochloride salt, mixing the solution with a solution of acetyl cellulose so that 7.5 per cent of resin is combined with the acetyl cellulose, and making the solution into an artificial product.

3. A process of producing artificial fibers and foils with an increased capacity of being dyed by acid dyestuffs which comprises adding to the solution of a moderately ethylated cellulose ethylether in a mixture of benzene and alcohol 6 per cent calculated on the cellulose ethylether of an artificial resin obtained by treating a p-butyl-phenol formaldehyde resin with β-bromethylamine in alcoholic alkaline solution and the artificial resin thus obtained with an equivalent quantity of chloral, making the solution into an artificial product and treating said artificial product with dilute formic acid containing 5 per cent of salicylic acid calculated on the treated artificial product.

PAUL SCHLACK.